L. SMITH.
METHOD OF MAKING CROSS RULED SHEETS.
APPLICATION FILED JUNE 28, 1916.

1,210,862.

Patented Jan. 2, 1917.

FIG. 1

Deposits — Checks in Detail — Balance

FIG. 2

1916

TOTAL CREDIT BALANCE
TOTAL DEBIT BALANCE

Witnesses:

Inventor
Louis Smith

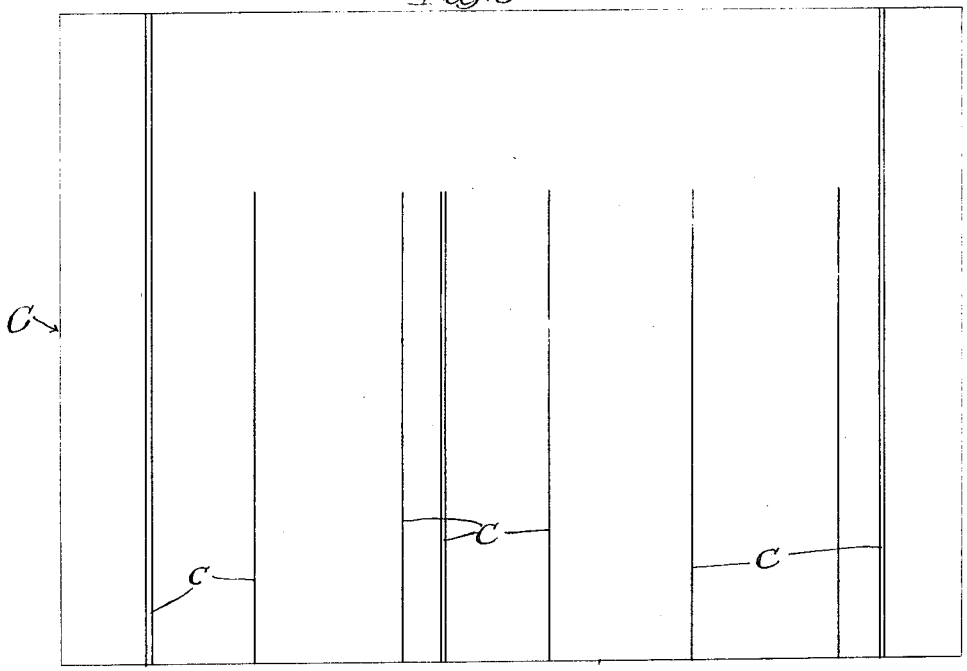
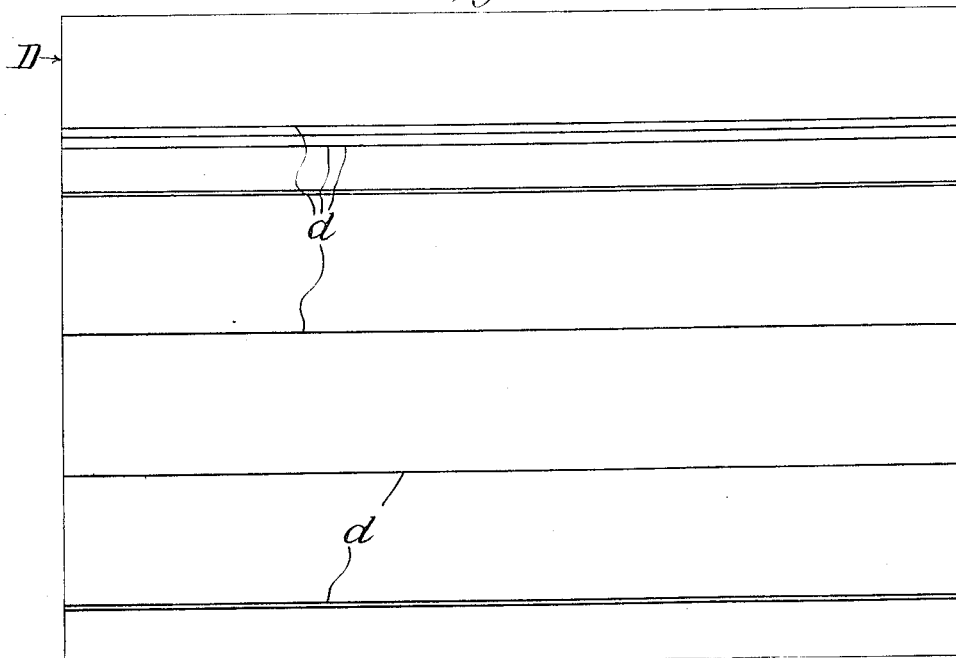

Fig. 5
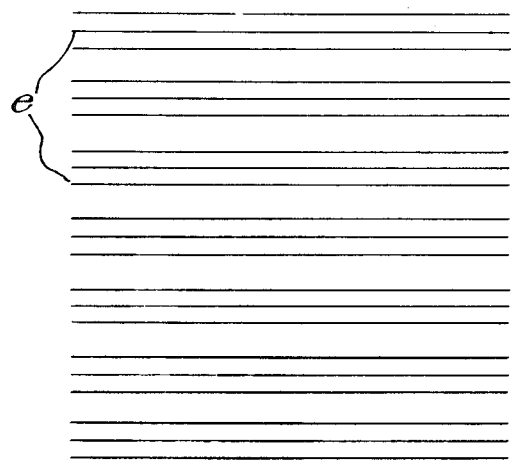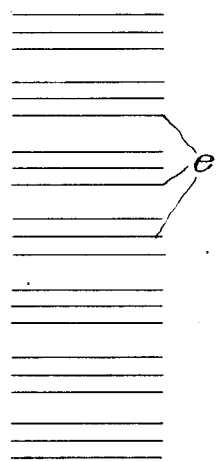
Fig. 6
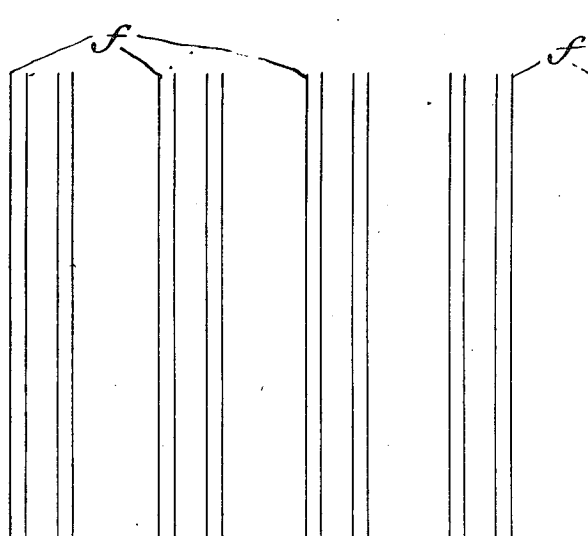

L. SMITH.
METHOD OF MAKING CROSS RULED SHEETS.
APPLICATION FILED JUNE 28, 1916.

1,210,862.

Patented Jan. 2, 1917.
5 SHEETS—SHEET 4.

FIG. 7

| | Deposits | Checks in Detail | | Balance | |
|---|---|---|---|---|---|
| 1 | | | | | 1 |
| 2 | | | | | 2 |
| 3 | | | | | 3 |
| 4 | | | | | 4 |
| 5 | | | | | 5 |
| | | TOTAL CREDIT BALANCE TOTAL DEBIT BALANCE | | | |

FIG. 8

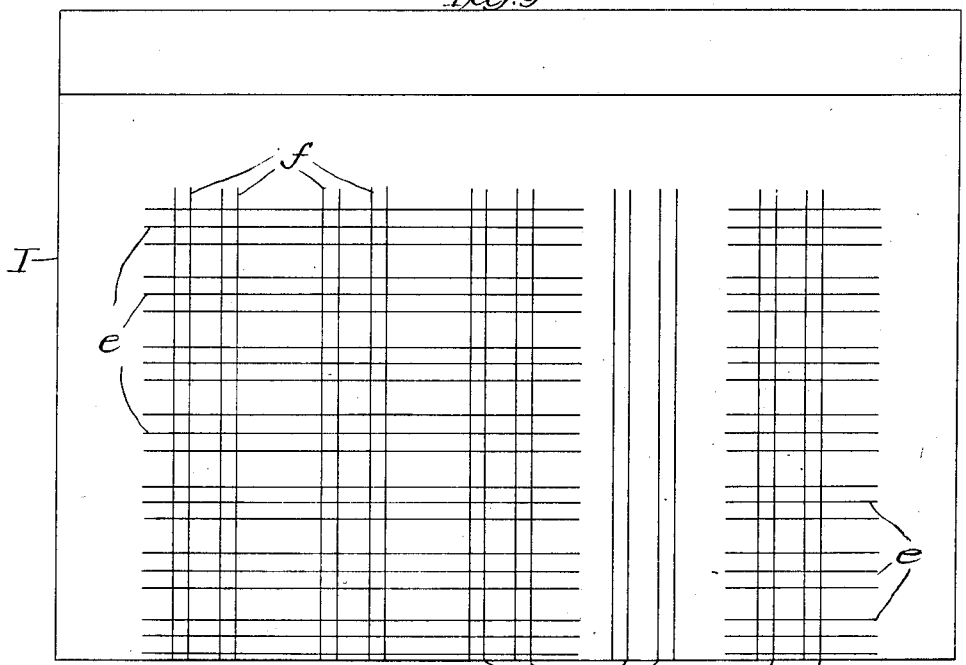

UNITED STATES PATENT OFFICE.

LOUIS SMITH, OF CHICAGO, ILLINOIS.

METHOD OF MAKING CROSS-RULED SHEETS.

1,210,862.      Specification of Letters Patent.      Patented Jan. 2, 1917.

Application filed June 28, 1916. Serial No. 106,313.

*To all whom it may concern:*

Be it known that I, LOUIS SMITH, a citizen of the United States, and a resident of Chicago, in the county of Cook and State of Illinois, have invented certain new and useful Improvements in Methods of Making Cross-Ruled Sheets; and I do hereby declare that the following is a full, clear, and exact description thereof, reference being had to the accompanying drawings, and to the characters of reference marked thereon, which form a part of this specification.

This invention relates to a novel method or process of producing cross or tabular ruled sheets or forms either for separate use as record sheets or for use as book sheets, and the invention consists in the novel steps hereinafter set forth and more particularly pointed out in the appended claims.

Heretofore it has been the custom, in producing such ruled forms or sheets, to produce the ruled lines by the use of ruling machines, said machines embracing a number of beams on which are carried ruling pens, with means to supply ink thereto. Said ruling pens are adjustably mounted on the beams so that the ruled lines may be spaced at desired distances apart to produce the required unit spacing. In this method of producing ruled sheets, it is necessary to set up or adjust the pens for the down and cross lines of each job, a slow and tedious task, and one which requires expert skill and knowledge in the art. In many instances it is necessary to separately set up or adjust the pens for the different colored down or cross lines, thereby increasing the cost of the job. After a job of sheets has been run off by the ruling machine, said machine must be again set up and adjusted for each subsequent job, even though certain of the latter jobs be identical with one theretofore produced, but with the identical jobs separated by one or more of different identity. This work of adjusting the ruling machine is a large factor in the cost of producing ruled sheets, and, on account of the expense of adjusting the machine, it is not commercially practicable for the printing office to furnish the customer with a proof of the composed work before completing the job, and it has been the practice that where such proof has been required it is charged as an additional expense to the customer. Where such proof is not furnished, the liability to error occurs, and often entails considerable expense to the printing shop in correcting the same.

It is the purpose of the present invention to provide a method or system of producing multi-colored or other ruled sheets, primarily by the use of a printing press, either direct or offset, supplemented by transfer operations, such as are employed in lithographing, offset or printing plate processes or otherwise, in such a way that the pattern for each color, or set of lines if but one color be used, may be produced as a permanent pattern, from which pattern transfers or plates may be made, one for each color or set of lines, and thereafter successively printing the patterns on the final sheet in register, one over the other, to produce the final or multi-colored or cross-ruled sheet. The printing plates or elements may be retained by the printing shop so that when another job comes into the printing shop for the same ruling with respect to coloring or line arrangement, the work may be printed as an ordinary printing job without the necessity of preliminary preparations such as was originally required to produce the transfers or plates, or such as is required to adjust a ruling machine. Moreover, it is practicable to retain a number of proofs of the patterns for each color or line arrangement, so that in the event of the destruction of a plate or elements the same may be reproduced from the pattern proofs.

I have shown in the drawings a method of producing a three-colored ruled sheet; first, illustrating the separate down-line and cross-line forms which are composed to produce patterns of each color; thereafter showing the completed patterns for the different colors, and finally showing the finished ruled page produced by a properly registered composition of the patterns.

As shown in the drawings:—Figures 1 and 2 designate the down and cross lines, respectively, which constitute, when composed, the pattern of one color or set of lines. Figs. 3 and 4 designate the down and cross lines, respectively, of the forms for the pattern of another color or set of lines. Figs. 5 and 6 designate the down and cross lines, respectively, of the pattern of another color or set of lines. Figs. 7, 8 and 9 designate, respectively, the three patterns of a three-colored or three-line set job. Fig. 10 designates the finished ruled page.

In following the description, it may be assumed that the forms shown in Figs. 1 and 2 are appropriated to the dark blue lines of the finished sheet; the forms shown in Figs. 3 and 4 are appropriated to the red lines of the finished sheet, and that the forms shown in Figs. 5 and 6 are appropriated to the light blue lines of the finished sheet.

Referring to Fig. 10, it may be stated that the lines $a$, $a'$ are the down dark blue lines shown in form A of Fig. 1, and that the lines $b$ are the cross dark blue lines as shown in form B of Fig. 2. Likewise the lines $c$ are the down red lines shown in form C of Fig. 3, and the lines $d$ are the red cross lines shown in form D of Fig. 4. Likewise the lines $e$ are the light blue cross lines of the form designated as E in Fig. 5, and the lines $f$ are the light blue down lines shown in the form designated as F in Fig. 6.

In practice, the forms A—B, C—D and E—F are preferably primarily produced by a printing operation from a form set up in the manner of type by type-high or other rules. After each form has been thus composed or set up, a proof or impression therefrom by direct printing or otherwise is taken on a sheet of paper. After the impression has thus been printed from one form of a given color, the associated form of said color, which latter has been set up in the same way, is printed on the same sheet in register over the first printed form to produce the pattern for that particular color. For instance, the printing of the two forms, A and B, one upon the other, produces the pattern G shown in Fig. 7; the printing of the two forms C and D, one upon the other, produces the pattern H shown in Fig. 8, and the printing of the two forms E and F, one upon the other, produces the pattern I shown in Fig. 9. After the patterns have thus been produced, they are separately transferred to plates or elements, one for each color or set of lines, from which the final printing impressions are made on the finished sheet, the method of transfer depending upon the method of reproduction employed, whether it be a photo-lithographic process, offset process or the use of etched plates or otherwise. Thereafter registered printed impressions are taken from said plates so that the superposed patterns produce the final sheet J shown in Fig. 10.

When it is desired to print numerals, letters or words on the sheet, this may be done at the time one of the original forms is printed. As herein shown, assuming the forms A and B to be the original dark blue forms, certain of the numerals which do not interfere or clash with the down lines may be printed on the form A, and others which the down lines intersect may be printed on the form B. If the figures, letters or words are to be printed in another color, they will be printed on the sheet bearing that color. Moreover, said figures, letters and words may be produced in different colors by printing each color on the sheet bearing non-interfering lines of the same color.

An advantage of the processes described is that the cross and ruled lines are definite, sharp and continuous throughout their lengths, there being no breaks or interruptions at the intersections of the crossed lines, such as occurs in direct printing from set up cross ruled forms. Furthermore, the lines are of uniform width throughout their lengths, a condition which cannot be assured in tabular ruling produced by a ruling machine, due to liability of non-uniform flow of ink from the ruling pens.

The complete process described may be executed in successive steps in a single shop, or it may be convenient or desirable to produce the patterns at one shop, or in one department of a large plant, and send the patterns to another shop, or to another department of the same plant, to transfer the patterns to printing plates and complete the printing.

It will, of course, be understood that the particular character of the blank form or page will be varied to suit the requirements of the user. The method described finds a great advantage when used in producing what may be termed standard or stock sheets, inasmuch as the patterns or proofs may be filed away and kept for future use, thereby avoiding the necessity of re-composing the form. While I prefer to produce the original forms A—B, C—D, E—F, by setting up the primary forms from rules in the manner of type and thereafter separately printing each two forms to produce the resultant pattern, it will be understood that said patterns may be otherwise produced. Moreover, the forms A—B, C—D and E—F may be otherwise transferred from the set of ruled forms than by direct printing, as by a photographic process. It will be furthermore understood that the method described may be employed to produce cross-ruled sheets wherein the lines are of a single color.

I claim as my invention:—

1. The method of making cross ruled sheets which consists in producing a cross lined pattern for each set of lines with the lines continuous from end to end and sharply intersecting at their crossings, thereafter transferring said patterns to printing elements, and finally printing from said elements to produce the finished ruled sheet.

2. The method of making cross ruled sheets which consists in separately producing down and cross line forms for each set of lines, superimposing the down and cross line forms for each set in register to produce patterns, transferring said patterns to printing plates and finally printing the several plates in register to produce the composite cross ruled sheet.

3. The method of making cross-ruled sheets which consists in separately producing down and cross line forms for each set of lines; printing the down and cross line forms for each set in register to produce patterns for the several sets; transferring said patterns to printing plates, and finally printing the several plates in register to produce the composite cross-ruled sheet.

4. The method of making cross-ruled sheets which consists in separately setting up forms of rules for the down and cross lines of the several sets of lines; printing in register the cross and down lines of each set to produce a composite pattern for each set; producing transfers from said patterns, and finally printing the transfers in register to provide the final cross-ruled sheet.

5. The method of making cross-ruled sheets which consists in separately setting up forms of rules for the down and cross lines of the several sets of lines and composing type on one or more of said forms; printing in register the cross and down lines and composed type of each set to produce a composite pattern for each set; producing transfers from said patterns, and finally printing the transfers in register to provide the final cross-ruled sheet.

In testimony whereof I have hereunto set my hand at Chicago, Illinois, this 23rd day of June, 1916.

LOUIS SMITH.

Witnesses:
    WILLIAM L. HALL,
    M. GERTRUDE ADY.